United States Patent [19]

Camp

[11] 3,845,847
[45] Nov. 5, 1974

[54] THROTTLE, IGNITION AND BRAKE CONTROLS
[76] Inventor: Richard H. Camp, P.O. Box 62, Haines, Oreg. 97833
[22] Filed: Aug. 20, 1973
[21] Appl. No.: 389,939

[52] U.S. Cl............. 192/3 S, 74/489, 123/198 DC, 200/61.87, 74/532, 188/265
[51] Int. Cl............................................. B60k 29/00
[58] Field of Search .......... 192/3 R, 3 S; 200/61.85, 200/61.87; 74/551.8, 489; 123/198 D, 198 DC

[56] References Cited
UNITED STATES PATENTS
| | | | |
|---|---|---|---|
| 3,694,596 | 9/1972 | Carison........................... | 200/61.87 |
| 3,734,230 | 5/1973 | Tanaka........................ | 123/198 DC |
| 3,742,928 | 7/1973 | Albertson..................... | 123/198 DC |
| 3,758,736 | 9/1973 | Tanaka........................ | 123/198 DC |

Primary Examiner—Benjamin W. Wyche
Attorney, Agent, or Firm—John W. Kraft; Charles L. Kraft, II

[57] ABSTRACT

The systems shut-down handle for motorized apparatus comprises the housing; a throttle assembly having a pivotally mounted handle lever juxtapositioned about the grip of a handlebar of the apparatus, the throttle lever being connected to the apparatus throttle cable; and a brake and shut-down assembly having a brake lever pivotally mounted to the housing about the grip and is disengaged when the lever is depressed adjacentely about the handlebar grip and engages the brake when the lever is released and pivoted away from the grip. The lever is provided with means for actuating a cut-off switch which may break the electrical circuit controlling ignition in the engine. The brake and shut-down assembly may further include an idling trigger which may retain the brake lever adjacent the grip to disengage the brake and maintain the engine circuit.

10 Claims, 4 Drawing Figures

THROTTLE, IGNITION AND BRAKE CONTROLS

FIELD OF THE INVENTION

The present invention relates to control handles for motorized apparatus and the like, and more particularly to a combination accelerated control handle and automatic brake and shut-down assembly to apply brakes and shut down the engine when the handle is released.

DESCRIPTION OF THE PRIOR ART

It is a principal problem with a number of motorized apparatus, particularly recreational vehicles such as motorized snow sleds, gas powered tools and the like, that in an emergency situation the brake is not automatically applied, or must be applied by temporary manual pressure. The engine is almost invariably permitted to continue an operation. With motorized snow sleds, the problem is further compounded by the typical handlebar throttle control, and the straddle, perch-like saddle on which the rider may be more captive than in control. Thus, the rider may be thrown or not in control and the vehicle may continue to move for lack of application of the brakes and the motor continuing to run. This is especially so if the throttle cable is damaged or becomes stuck, and the engine remains in a high operating speed through the emergency. The potential for injury and damage is obvious.

Accordingly, it is an object of the present invention to provide a combination control handle which includes a variable throttle control, and a brake and shut-down assembly which may both apply the brake and stop the engine if the handle is released.

It is further object that the brake and shut-down assembly include various alternative for providing mechanical movement to apply the brakes either by a linkage which pushes the conventional brake system provided in the various types of vehicles.

It is another object of this invention to provide means for retaining the brake and shut-down assembly of the combination handle in a position which retains the brake out of engagement and which maintains operation of the engine.

It is a further object of this invention that the brake and shut-down assembly be provided with an override switch which may permit the brake to be applied without the cut-off switch being operable to shut off the engine, and that said override be applied only by a conscious decision act of the operator.

These and other objects shall become apparent from the description following, it being understood that modifications may be made without affecting the teachings of the invention here set out.

SUMMARY OF THE INVENTION

The systems shut-down handle for motorized apparatus comprises the housing; a throttle assembly having a pivotally mounted handle lever juxtapositioned about the grip of a handlebar of the apparatus, the throttle lever being connected to the apparatus throttle cable; and a brake and shut-down assembly having a brake lever pivotally mounted to the housing about the grip and is disengaged when the lever is depressed adjacently about the handlebar grip and engages the brake when the lever is released and pivoted away from the grip. The lever is provided with means for actuating a cut-off switch which may break the electrical circuit controlling ignition in the engine. The brake and shut-down assembly may further include an idling trigger which may retain the brake lever adjacent the grip to disengage the brake and maintain the engine circuit. Alternating embodiments of the brake and shut-down assembly includes means which result in a "push" or which result in a "pull" of the brake control cable. A further embodiment of the brake and shut-down handling includes an idling trigger to retain the brake cover adjacent the grip to maintain operation of the engine and hold the brakes disengaged. A still further embodiment of the brake and shutdown assembly includes an override switch which may permit the brake lever to be released to engage the vehicle brakes while overriding the ignition cut-off switch to maintain the engine at idling speed.

A more thorough and comprehensive understanding may be had from the detailed description of the preferred embodiment when read in connection with the drawings forming a part of this specification.

DETAILED DESCRIPTION OF THE PREFERRED EMBODIMENT

Figure 1:
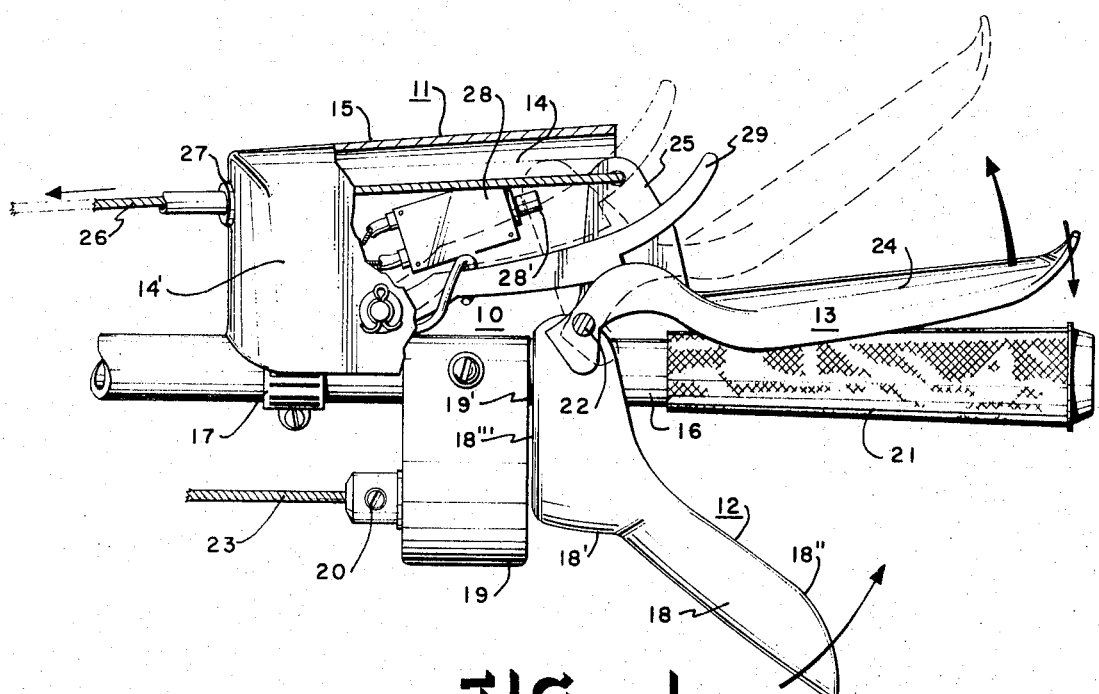
FIG. 1 is a left side view of the systems shut-down handle of this invention with a portion of the housing broken away and the brake and shut-down assembly in its various operating positions.
Figure 2:
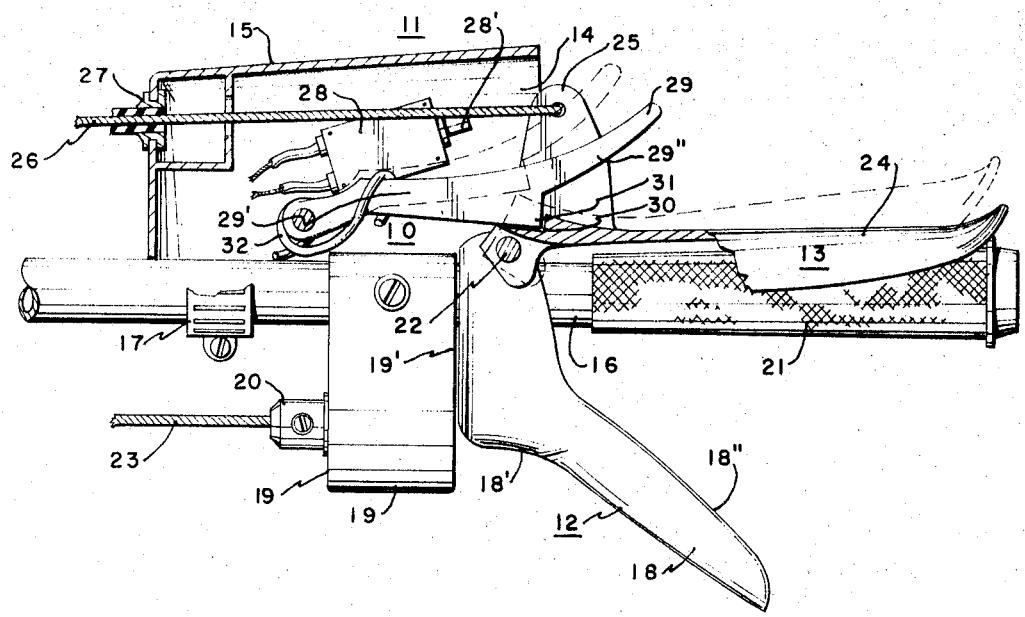
FIG. 2 is a side elevational view of the apparatus of FIG. 1 with the side wall of the housing completely removed, and the idling trigger shown in its various operating positions.

Referring now to the drawings and more particularly to the FIGS. 1 and 2, the systems shut-down handle of this invention is shown to advantage and generally identified by the numeral 10. The systems shut-down handle 10 comprises a housing 11, a throttle assembly 12, and a brake and shut-down assembly 13. The housing 11 provides the principal protective enclosure, support and mounting means for the handle 10. The housing 11 may be configured in any of the number of suitable shapes such as a substantially rectangular solid having a pair of upstanding rectangularly shaped sidewalls 14 and 14' having the longest dimensions disposed substantially horizontally, and a top wall 15 at the uppermost terminal edge of the walls 14 and 14'. It may be seen that the housing 11 may be fabricated of suitably bent sheet stock or high impact plastic. The housing 11 is fastened distally from the terminal end of the handlebar 16 of a vehicle (not shown) by means of ring clamps 17.

The throttle assembly 12 is a variable control means for operating the engine of the vehicle in the matter of conventional accelerators. The throttle assembly 12 comprises a lever 18, a lever stop 19, and a throttle cable guide 20. The lever 18 is a handle member which may be conveniently grasped by disposing the fingers of the hand around the grip 21 of the end portion of the handlebar 16. The lever 18 may be fabricated of rolled sheet material or high impact plastic and disposed with its open edge oriented upwardly, under the curvature of the grip 21. The lever 18 includes a rectangular body portion 18', and a tapering handle portion 18" which projects rectilinearly, at an oblique angle from the corner of the body portion 18'. The lever 18 is pivotally mounted to the rearward lowermost corners of the sidewalls 14 and 14' of the housing 11 on a pin 22, with the handle portion 18" disposed downwardly and with its central axis in alignment with the central axis of the handlebars 16. An upstandingly disposed contact edge 18'" of the body portion 18' is disposed on the side opposite the grip 21. The lever stop 19 is a member having its rearward uppermost terminal edge 19' operable to contact and retain the body portion 18'. The lever stop 19 is fastened distally from the grip 21 to the centermost portion of the handlebar 16 with the edge 19' positioned to contact the edge 18'" corresponding to the "off" or idling position of the throttle lever 18. The throttle cable 23 is fastened distally below the uppermost terminal edge of the body portion 18'. It has been found to advantage to provide a sleeve-like guide 20 fastened at a suitable point in the upstanding terminal edge of the stop 19 opposite the edge 19'. The guide 20 is a sleeve-like member fastened at a suitable point in the upstanding terminal edge of the stop 19 opposite the edge 19'.

In operation the lever 18 may be pivoted on the housing 11 toward the grip 21 to increase activity in the vehicle engine. Compressive force on the lever 18 toward the grip 21 may be relaxed, and the lever 18 permitted to pivot away from the grip 21, to reduce activity of the engine 21. The means for applying urging force to pivot the lever 18 outwardly, to ultimately cause the contact of the edges 19' and 18'", may be provided by the usual urging springs provided in the throttle portion of the engine. Supplemental springs may also be provided in the housing 11 and lever 18.

The brake and shut-down assembly 13 is operable to simultaneously activate the brake system and stop operation of the vehicle engine. The brake and shut-down assembly 13 is provided with a lever 24 which permits operation of the vehicle when it is compressed substantially adjacent to the grip 21. The lever 24, like the lever 18, may be fabricated of rolled sheet material with its open terminal edge disposed over the grip 21. It may be seen that the members 18 and 24 disposed with their openings about the grip 21 are operable to substantially mate with the curvature of the grip 21 in a compact control structure. The terminal end of the lever 24 opposite the terminal end of the handlebars 16 is pivotally mounted to the housing 11 at a point which may be the pin 22, with its central axis in alignment with the central axis of the grip 21. A clevis 25 is fastened upstandingly from the uppermost terminal side of the lever 24 distally from its end opposite the terminal end of the handlebar 16. A brake control cable 26 is fastened distally from the uppermost terminal end of the clevis 25. The brake control cable 26 is carried into the housing 11 by a guide 27 disposed in the uppermost forward wall of the housing 11 with its central axis in alignment with the central axis of the handlebar 16. The brake control cable 26 is fastened in parallel with the conventional brake pedal or brake handle connection (not shown) to the brake mechanism (not shown).

The brake and shut-down assembly 13 includes a cut off switch 28 which is connected in parallel alignment with the ignition circuit of the engine. The cut off switch 28 is suitably mounted in the housing 11 between the sidewalls 14. The cut off switch 28 may be a reverse push button operable to maintain the circuit when the button 28' is extended, and to brake the circuit and thus stop operation of the engine when the button is depressed. Mechanical means for depressing the button 28' may be a terminal edge adjacent the switch 28 of the clevis 25 of the lever 24. It is to be understood that the cut off switch 28 may be successfully employed alone in a shut-down assembly 13 in such apparatus as gas-powered tools and the like, in which release of the lever 24 would stop the operation of the engine.

It may be seen that under certain conditions the vehicle may be stopped and unoccupied but the engine will be required to continue to idle. Accordingly, the brake and shut-down assembly 13 is provided with an idling trigger 29. The idling trigger 29 is operable to retain the lever 24 in a depressed position, adjacent to the grip 21. The idling trigger 29 is pivotally mounted at a point distally forward the pin 22 in the housing 11 with respect to the handlebar 16 and projects from between the walls 14 and 14', adjacent through the clevis 25 distally from the terminal edge adjacent the grip 21 of housing 11. The terminal end adjacent the pin 22 of the uppermost terminal edge of the lever 24 is provided with a receiving slot 30. The idling trigger 29 itself may be conveniently divided into an arm portion 29' and a finger portion 29". The arm 29' as set out above is disposed and is provided on its end opposite the pivot with a shoulder 31 which may engage the slot 30. The finger portion 29" projects past the clevis 25 over the portion adjacent the pin 22 of the lever 24 at the upper edge of the shoulder 31. The pivot securing the trigger 29 to the housing 11 is provided with a coil spring 32 which urges the finger portion 29" upwardly with respect to the grip 21. In operation the lever 29 may be depressed adjacent the upper edge of the lever 24 until the shoulder 31 is engaged in the receiving slot 30. The vehicle brake may be engaged, and the engine stopped by simply depressing the lever 24 adjacent the grip 21 until the coil spring 32 urges the idling trigger 29 to disengage the shoulder 31 in the slot 30; the lever 24 may then be released the brake and ignition are stopped in the same manner as embodiments as set out above.

Figure 3:
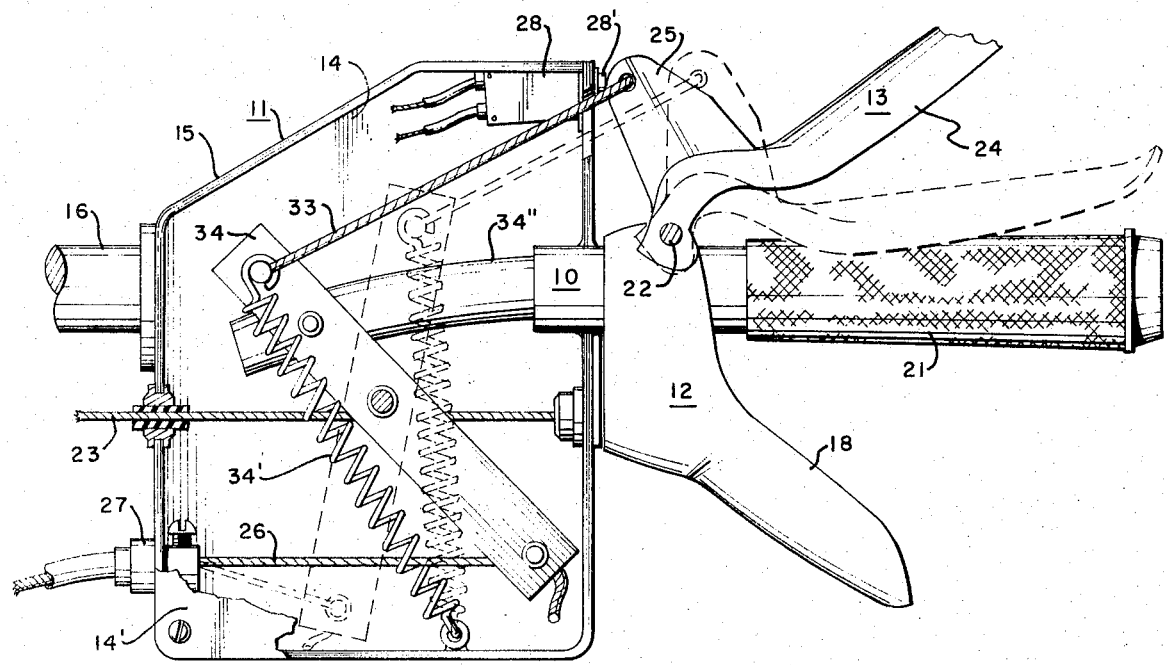
FIG. 3 is a cross-sectional view of a further embodiment of the brake and shut-down assembly of the present handle, shown in its shut-down and brake positions in solid lines and its vehicle operating position in broken lines.

It may be seen that the brake lever 24, set out above, is operable to pull the cable 26 as the lever 24 rotates away from the grip 21. It is obvious that some vehicles may include brake systems requiring the brake control cable 26 to be pulled by the lever 24. Referring to the FIG. 3, the brake and shutdown assembly 13 includes a brake lever 13 and cut off switch 28 substantially as set out above. The housing 11 may be fastened to the end of the handlebar 16, and may include a tubular grip 21. The assembly 13 further includes a half-rod 34 pivotally mounted at its center to the walls 14 and 14', and pivots from a diagonal line from the lower corner closest the grip 21 to the upper corner on the side opposite the grip 21 of the housing 11 to a vertical orientation. The forwardmost terminal end of the linkage 33 and the uppermost terminal end of the half-rod 34 are pivotally mounted to each other. The terminal end of the calbe 26 is fastened to the lowermost terminal end of the half-rod 34, and accordingly is provided with its cable guide 27 distally from the lowermost terminal edge of the wall at the end opposite the grip 21 of housing 11. An urging spring 34' may be provided between the uppermost terminal end of the half-rod 34 and the lowermost wall distally from the end adjacent the grip 21 of the housing 11, to provide urging force to pull the cable 26 and, to urge the lever 24 away from the grip 21 to engage the brake. Additional urging force may be provided by a spring loaded rod 34' the spring (not shown) being disposed between the end of the rod 34' and the interior terminal end of the hollow cylindrical handle 21", the rod 34" being carried within the grip 21 and fastened to the half-rod 34 between the connection of the linkage 33 and half-rod 34 and the central pivot of the half-rod 34. Leverage of the rod 34" on the half-rod 34 may be increased by a slight curvature, as shown in the FIG. 3. Operation of the brake and shut-down assembly 13 of the further embodiment is substantially identical to that set out above. As in the "pull" embodiment shown in FIG. 3, the further embodiment may include an idling trigger 29 substantially to that as set out above.

Figure 4:
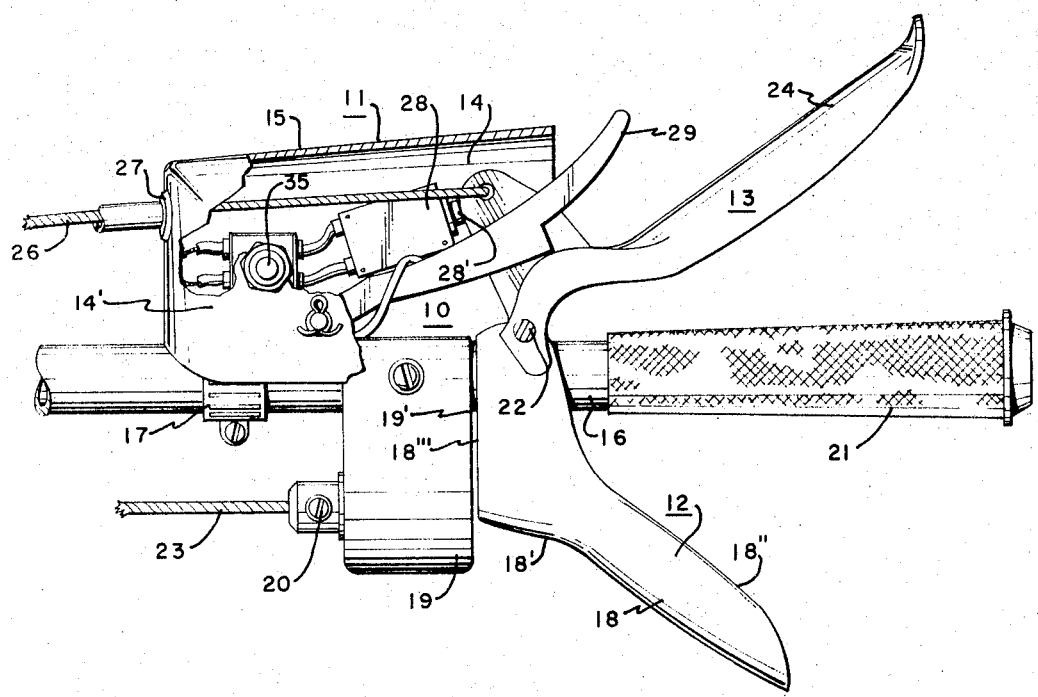
FIG. 4 is a side elevational view of the apparatus of FIG. 1 with the side wall of the housing partially removed including a further embodiment of the brake and shut-down assembly having an ignition hold override switch.

It may be seen that under certain conditions the operator may have to stop the vehicle while idling the engine, but with the vehicle brake system engaged by the lever 24 pivoted fully away from the handle grip 21. As shown in the FIG. 4, a further embodiment accomplishing this object includes an override switch 35 mounted into the wall 14 on the side facing the operator. The override switch 35 is connected in parallel between the lead wires which ultimately connects the switch 28 to the ignition circuit. The switch 35 may be a press-button toggle switch which may be engaged by the operator by a separate physical act from the operation of the handle 24. After the switch 35 has been closed the lever 24 may be released as set out above engaging the brake 24 and simultaneously depressing the button 28' of the switch 28 as set out above. The switch 35 forms a selectively closeable bridge which completes the ignition circuit to continue operation of the engine even though the button 28 is depressed. The switch 35 may be opened, and the brake and shutdown assembly 13 operates as before. It is to be understood that automatic contact means may be associated with the switch 35 which opens and resets a closed switch 35 after operation begins of the systems shut-down handle 10. These means may be associated with either the throttle control assembly 12 or the brake and shut-down assembly 13. It is to be further understood that these additional means may be mechanical or electro-mechanical.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. A systems shut-down handle for motorized apparatus having a throttle cable, a brake operator, and an electrical circuit controlling ignition, comprising:

A housing mounted to handlebars of said apparatus;

A throttle assembly including a pivotally mounted lever juxtapositioned over the grip of said handlebar to said housing, and being connected to its end adjacent said housing to the apparatus throttle cable; and A shut-down assembly having a brake lever connected to the brake operator pivotally mounted over said handlebar grip opposite and opposingly to said throttle lever and being provided with means for actuating a cutoff switch having means to brake the electrical circuit controlling ignition in the apparatus engine when said brake lever is released.

2. The apparatus of claim 1 wherein said brake lever of said shut-down assembly is connected at its end adjacent said housing to said brake operator which includes a cable connecting said systems shut-down handle with the brake system of said motorized apparatus.

3. The apparatus of claim 2 wherein said shut-down assembly includes means which "push" said brake control cable comprising a clevis fastened substantially perpendicularly to the end adjacent said housing of said lever, said brake control cable being fastened to the outer terminal end of said clevis.

4. The apparatus of claim 1 wherein said shut-down assembly includes means which "pull" on the brake control cable comprising a half-rod pivotally mounted at its center and fastened at one of its terminal ends to said brake lever by a linkage and at its end opposite to said brake control cable, said half-rod being mounted to pivot from a diagonal line in said housing wherein the terminal end fastened to said brake lever linkage is disposed away from said brake lever and the end connected to said brake control cable is disposed distally vertically adjacent said brake lever to a vertical orientation.

5. The apparatus of claim 1 including an idling trigger having means for selectively retaining said brake lever adjacent said grip.

6. The apparatus of claim 4 wherein said idling trigger includes a lever arm portion pivotally mounted in said housing distally from a pivot point of said brake lever and said housing in the direction opposite said housing with the end adjacent said grip said lever arm projecting from said housing above said brake lever, said lever arm having a shoulder portion on its side adjacent to said brake lever, the terminal end adjacent said pivot of said brake lever and said housing being provided with a slot being selectively engageable with said shoulder of said lever arm.

7. The apparatus of claim 6 wherein said lever arm is provided with a coil spring urging said lever arm away from said grip and said brake lever, and a finger portion disposed from the terminal end of said arm portion adjacent said brake lever.

8. The apparatus of claim 1 wherein said cut-off switch is a reverse push button connected into the electric circuit controlling ignition in the motor of said apparatus.

9. The apparatus of claim 1 wherein said cut-off switch is provided with an override switch having means to maintain operation of said engine with said brake lever is released, said means being engageable by a separate manual act.

10. The apparatus of claim 9 wherein said override switch is a press button toggle switch mounted in said housing, and being electrically connected in parallel to wires connecting said cut-off switch to said ignition circuit.

* * * * *